Oct. 4, 1927.
G. L. KYLE
1,643,949
METHOD OF TESTING BATTERIES FOR LEAKS
Filed Nov. 4, 1920
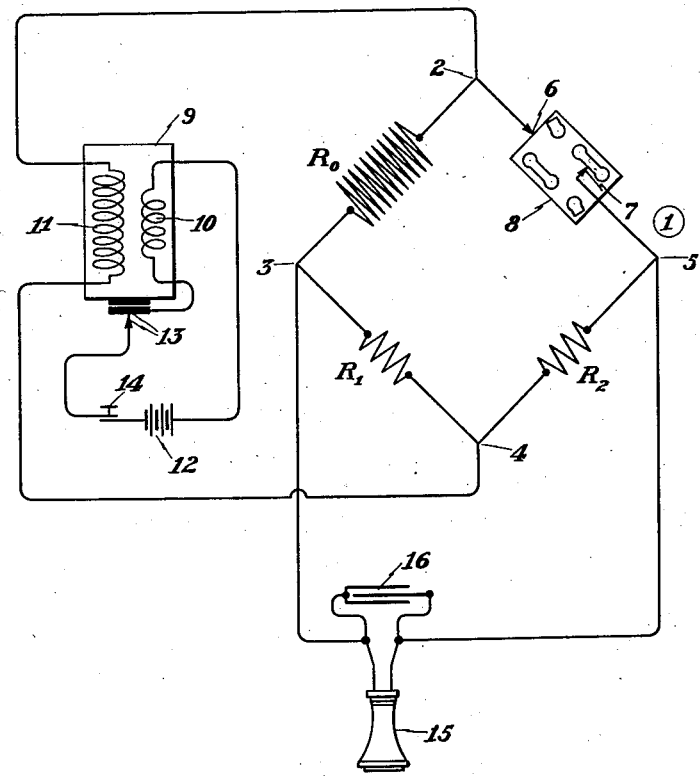
INVENTOR.
George L. Kyle
BY Raymond H Van Vest
ATTORNEYS.

Patented Oct. 4, 1927.

1,643,949

UNITED STATES PATENT OFFICE.

GEORGE L. KYLE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

METHOD OF TESTING BATTERIES FOR LEAKS.

Application filed November 4, 1920. Serial No. 421,760.

The present invention relates to method and means for testing for leaky batteries.

In storage battery practice, difficulty has been encountered, due to the fact that leaks occur in the storage battery cells. These leaks frequently do not become apparent until the storage batteries are installed in service, and prior to the present invention, have often caused heavy expense in dismantling the batteries to discover the seat of the trouble. Storage battery cells are commonly packed in boxes which are treated with material to prevent impregnation with acid. Such boxes, however, are so made that they permit the escape of acid through the bottom thereof. In any event, it is the invariable rule that acid which leaks from the interior of the battery cells finds its way very quickly to the exterior of the battery. The presence of the acid, though it be in a very thin film, reduces the electric resistance from the interior of a leaky cell to the exterior of the battery containing said cell, from a very high value to a relatively low value.

An object of the present invention is to provide a method and means for detecting leaks in a storage battery by utilizing the resistance between the interior of the storage battery cell and the exterior thereof.

A further object is to provide a testing method and means which are convenient and certain in operation.

Further objects will appear as the description proceeds.

The one figure of the drawing indicates schematically the manner in which the present invention is carried out.

As noted above, the resistance between the interior of the cell and the exterior thereof gives a very good indication of the soundness of the cell. The present invention is carried out by measuring said resistance. For this purpose a storage battery is placed in one of the legs of a Wheatstone bridge. The Wheatstone bridge for this purpose is indicated by the numeral 1. The four legs of the bridge are connected at the points 2, 3, 4, and 5, the points 3 and 5 being mutually oppositely placed and the points 2 and 4 being mutually oppositely placed. Between the points 2 and 3 is placed a high ohmic resistance $R_0$ which, in the system illustrated, should be noninductive. This resistance may approach in value the resistance from the interior to the outside wall of a sound battery, as for example, about 100,000 ohms. A resistance $R_1$ will be placed between the points 3 and 4 and a resistance $R_2$ will be placed between the points 4 and 5. Resistances $R_1$ and $R_2$ may be chosen of relatively low value and will be of nearly equal value. Connected to the point 2 is a contact member 6, while connected to the point 5 is a contact member 7. Contact members 6 and 7 are adapted to be connected to the electrical connecting members and to the exterior case of a storage battery. A storage battery is indicated by the numeral 8. Contact member 6 is shown in engagement with the exterior of said storage battery 8, while contact member 7 is illustrated as being in contact with one of the links of said storage battery. Connected across points 2 and 4 of the Wheatstone bridge is a source 9 of alternating or intermittent current. Said source 9 is illustrated as comprising a primary coil 10 and a secondary coil 11. The coils 10 and 11 may constitute the two coils of a transformer, if alternating current is available. In the drawing, the coils 10 and 11 have been indicated as part of an induction coil. Said coil 10 is energized by a source of E. M. F. indicated by the numeral 12 as a storage battery. The circuit of battery 12 and coil 10 includes vibrating contacts 13 which are adapted to make and break the circuit between said battery 12 and coil 10. As is well understood, the contacts 13 will be opened and closed in response to the energization of the coil 10, producing an intermittent flow of current through said coil 10, whereby to induce an alternating current in the secondary coil 11. The switch member 14 may be provided to protect the battery 12 from discharging when the apparatus is not being used.

Connected across points 3 and 5 of the bridge is a device for indicating a difference of potential between said points 3 and 5. Said means is shown as a telephone receiver 15. A condenser 16 may be connected across the terminals of said receiver 15. This condenser will eliminate disturbances due to condensive reactance and thus help to establish a well defined minimum in the balance of the bridge for the initial setting, namely, that for a sound battery. If preferred, any other device may be used for indicating a difference of potential across points 3 and 5.

A mode of operation of the above described embodiment of the present invention is substantially as follows:

When it is desired to test a battery for leaks, said battery is placed between the points 2 and 5 of the Wheatstone bridge 1, one contact, as for instance, contact 6, being electrically connected to the exterior of the battery, preferably at the bottom thereof, while contact 7 is electrically connected to the electrical elements of the battery, as by connection to one of the terminal posts or links of the battery. The switch 14 will be closed, whereby an intermittent current will flow through the primary coil 10, inducing an alternating current of relatively high voltage across the secondary coil 11. The Wheatstone bridge will have been adjusted, whereby to produce an electrical balance across said bridge under conditions when a sound battery is connected between points 2 and 5. Under these conditions there will be substantially no difference of potential between points 3 and 5. According to the formula of the Wheatstone bridge, the resistance across the storage battery will be $$R_0 \frac{R_2}{R_1}.$$

With the Wheatstone bridge 1 so adjusted, if a storage battery 8 is inserted between points 2 and 5, having a materially lower resistance between the interior and exterior thereof than should be had across a sound battery, there will be a material unbalancing of the bridge, resulting in a decided difference in potential across points 3 and 5. Inasmuch as this difference of potential is in an alternating current circuit, the result will be a very decided noise in the telephone receiver 15. The operator, by holding the receiver 15 to his ear, will therefore be able to detect a leak in the battery at once.

In practice, a number of batteries which are to be tested may be placed upon a surface of conducting material. The contact member 6 may be connected to said member of conducting material and the contact member 7 may be touched in rapid succession to the terminals of the various batteries. It will be understood, of course, that the switch member 14 will be kept closed while the batteries are to be tested. In case no noise is produced in the telephone receiver 15 the operator will know that the battery under test is sound. If, on the other hand, he hears a noise in the receiver 15, he will know that the battery is leaking electrolyte.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. The method of testing batteries for leaks which consists of measuring the electrical resistance between the elements contained within a battery and the exterior of said battery at the bottom thereof and comparing said measured resistance with the resistance of a sound battery similarly measured.

2. The method of testing for seepage of electrolyte from a storage battery which consists of balancing a Wheatstone bridge with a sound battery connected in one leg of said bridge, said battery being so connected that the circuit therethrough extends from the elements contained within the battery to the exterior of the container of said battery, connecting in similar manner a battery to be tested in place of said sound battery and observing any resulting unbalancing of said bridge.

3. The method of testing for seepage of electrolyte from a storage battery which consists of providing a Wheatstone bridge of which one leg includes a high ohmic resistance and an adjacent leg includes a sound storage battery, connections being made to the battery elements and to the exterior of the battery casing, connecting a source of E. M. F. across the intersection of said legs and the opposite point of said bridge, balancing the bridge, connecting a battery to be tested in place of said sound battery and observing any resulting unbalancing of said bridge.

4. The method of testing for seepage of electrolyte from a storage battery which consists of providing a Wheatstone bridge of which one leg includes a high ohmic resistance, balancing said bridge with a high ohmic resistance in an adjacent leg, connecting a source of E. M. F. across the intersection of said legs and the opposite point of said bridge, connecting a battery to be tested in place of said second mentioned ohmic resistance and observing any unbalancing across the other two points of said bridge, the path through said battery being from certain of the cell connections to the exterior of said battery at the bottom thereof.

In witness whereof, I have hereunto subscribed my name.

GEORGE L. KYLE.